(12) United States Patent
Dobbin

(10) Patent No.: US 12,060,162 B2
(45) Date of Patent: Aug. 13, 2024

(54) SPARK CONTAINMENT CAP

(71) Applicant: AIRBUS OPERATIONS LIMITED, Bristol (GB)

(72) Inventor: Richard Dobbin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 288 days.

(21) Appl. No.: 17/647,991

(22) Filed: Jan. 14, 2022

(65) Prior Publication Data

US 2022/0135247 A1    May 5, 2022

Related U.S. Application Data

(63) Continuation of application No. 16/203,590, filed on Nov. 28, 2018, now Pat. No. 11,254,443.

(30) Foreign Application Priority Data

Nov. 29, 2017    (GB) ..................... 1719833

(51) Int. Cl.
  *F16B 33/00*    (2006.01)
  *B64D 45/02*    (2006.01)
  (Continued)

(52) U.S. Cl.
  CPC .......... *B64D 45/02* (2013.01); *F16B 19/1054* (2013.01); *F16B 33/004* (2013.01);
  (Continued)

(58) Field of Classification Search
  CPC .... F16B 19/1054; F16B 33/004; F16B 37/14; F16B 41/002; F16B 41/005; F16B 33/00; B64D 45/02; Y10S 411/91
  (Continued)

(56) References Cited

U.S. PATENT DOCUMENTS

5,082,409 A * 1/1992 Bias .................. F16B 37/14
                                          411/372.5
5,181,817 A * 1/1993 Anderson ............ F16B 5/025
                                          411/372.5
(Continued)

FOREIGN PATENT DOCUMENTS

EP    2860410    4/2015
EP    3156670    4/2017
(Continued)

OTHER PUBLICATIONS

Partial European Search Report for European Application No. 18207758.6, 16 pages, mailed Apr. 8, 2019.
(Continued)

*Primary Examiner* — Roberta S Delisle
(74) *Attorney, Agent, or Firm* — Nixon & Vanderhye P.C.

(57) ABSTRACT

A spark containment cap for forming a sealed cavity around an end of a fastener protruding from a structure is disclosed having a cap body with an annular base terminating at a rim which surrounds an opening into an air cavity arranged to enclose the end of the fastener. An annular sealing volume extends around the rim arranged to receive an annular bead of a curable sealing material around the opening into the cavity to provide a seal between the cap body and the structure to seal a volume of gas within the cavity. An engaging feature is configured to engage with the end of the fastener to prevent rotation of the fastener relative to the cap when the end of the fastener is received by the cap. A fastening system, a joint, an aircraft and a method of securing a fastener and a spark containment cap to a structure are also disclosed.

20 Claims, 8 Drawing Sheets

(51) Int. Cl.
  *F16B 19/10* (2006.01)
  *F16B 37/14* (2006.01)
  *F16B 41/00* (2006.01)

(52) U.S. Cl.
  CPC .............. *F16B 37/14* (2013.01); *F16B 33/00* (2013.01); *F16B 41/002* (2013.01)

(58) Field of Classification Search
  USPC .................................... 411/372.5, 372.6, 373
  See application file for complete search history.

(56) References Cited

U.S. PATENT DOCUMENTS

| | | | | |
|---|---|---|---|---|
| 6,053,683 | A * | 4/2000 | Cabiran | F16B 37/14 411/374 |
| 6,808,350 | B1 * | 10/2004 | Tooman | F16B 37/14 411/372.5 |
| 8,388,293 | B2 | 3/2013 | Hutter, III | |
| 8,882,423 | B2 * | 11/2014 | Watanabe | F16B 37/14 411/337 |
| 9,011,062 | B2 * | 4/2015 | Chirol | B64D 45/02 411/372.5 |
| 2004/0165967 | A1 * | 8/2004 | Winker | F16B 37/14 411/372.5 |
| 2008/0159826 | A1 | 7/2008 | Dietz et al. | |
| 2011/0226896 | A1 | 9/2011 | Bessho et al. | |
| 2012/0155987 | A1 | 6/2012 | Watanabe | |
| 2013/0223951 | A1 * | 8/2013 | Bessho | B64D 45/02 411/511 |
| 2015/0184688 | A1 | 7/2015 | Dobbin et al. | |
| 2015/0300397 | A1 * | 10/2015 | Dobbin | F16B 37/14 411/372.6 |
| 2016/0169266 | A1 * | 6/2016 | Dobbin | F16B 37/14 156/60 |
| 2016/0195125 | A1 * | 7/2016 | Dobbin | B64D 45/02 411/372.6 |
| 2016/0245330 | A1 | 8/2016 | Dobbin | |
| 2017/0050746 | A1 | 2/2017 | Dobbin | |
| 2018/0057142 | A1 | 3/2018 | Wilkerson | |
| 2019/0331160 | A1 * | 10/2019 | Cowan | F16B 39/24 |

FOREIGN PATENT DOCUMENTS

| | | |
|---|---|---|
| FR | 2626629 | 8/1989 |
| FR | 2 687 195 | 8/1993 |
| GB | 2514171 | 11/2014 |
| GB | 2520774 | 6/2015 |
| WO | 2014118117 | 8/2014 |
| WO | 2014118509 | 8/2014 |
| WO | 2014118510 | 8/2014 |

OTHER PUBLICATIONS

Combined Search and Examination Report for GB 1719833.4, dated Feb. 6, 2018, 6 pages.

Search Report for GB 1719833.4, dated Sep. 4, 2018, 4 pages.

* cited by examiner

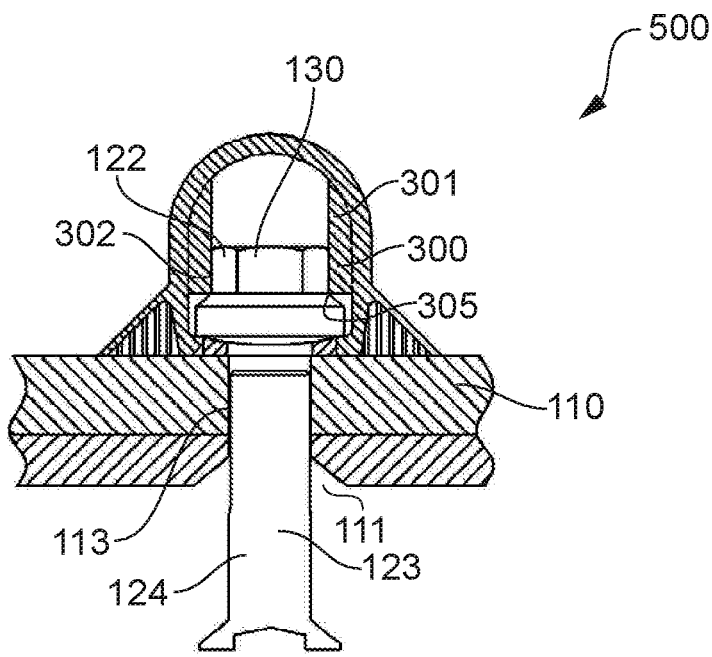
FIG. 5
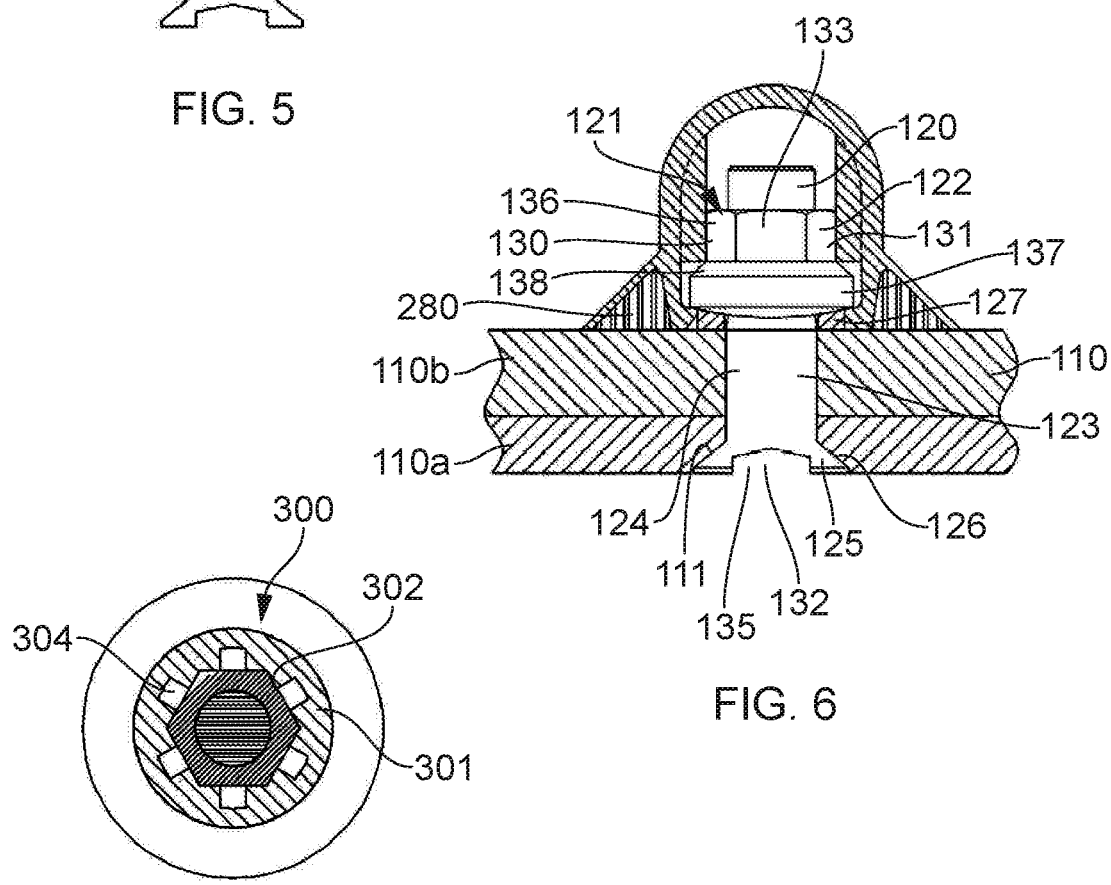
FIG. 6
FIG. 7

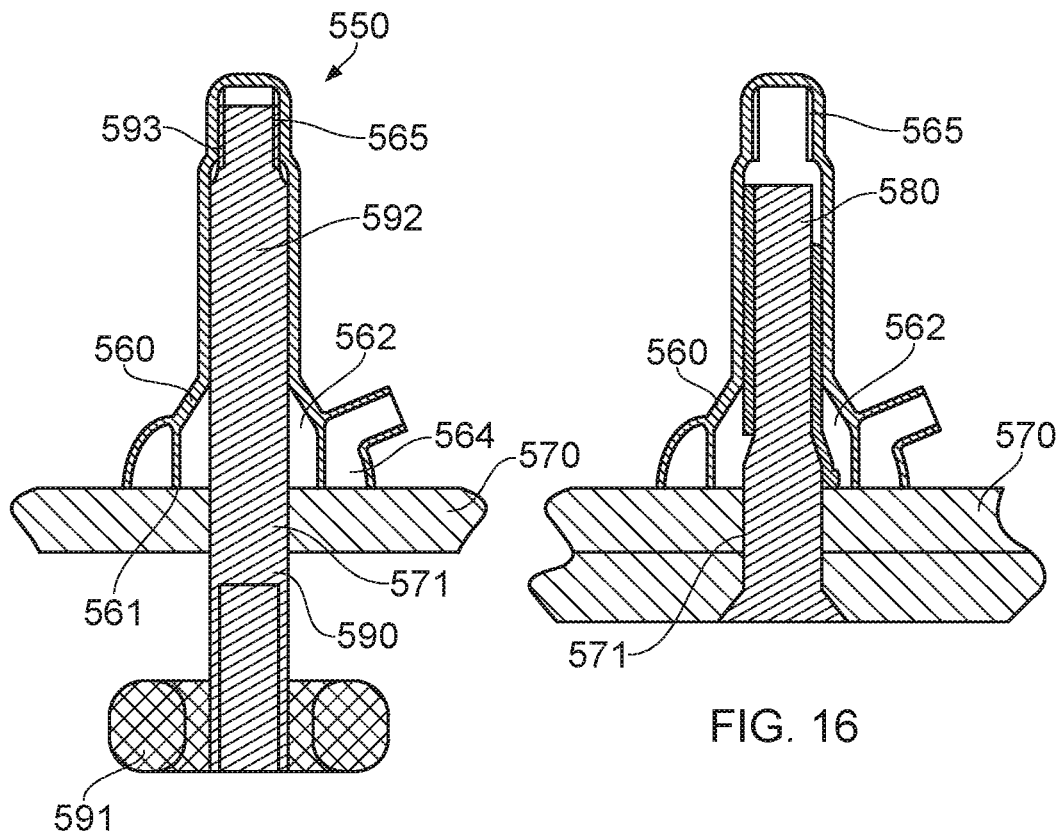
FIG. 15
FIG. 16
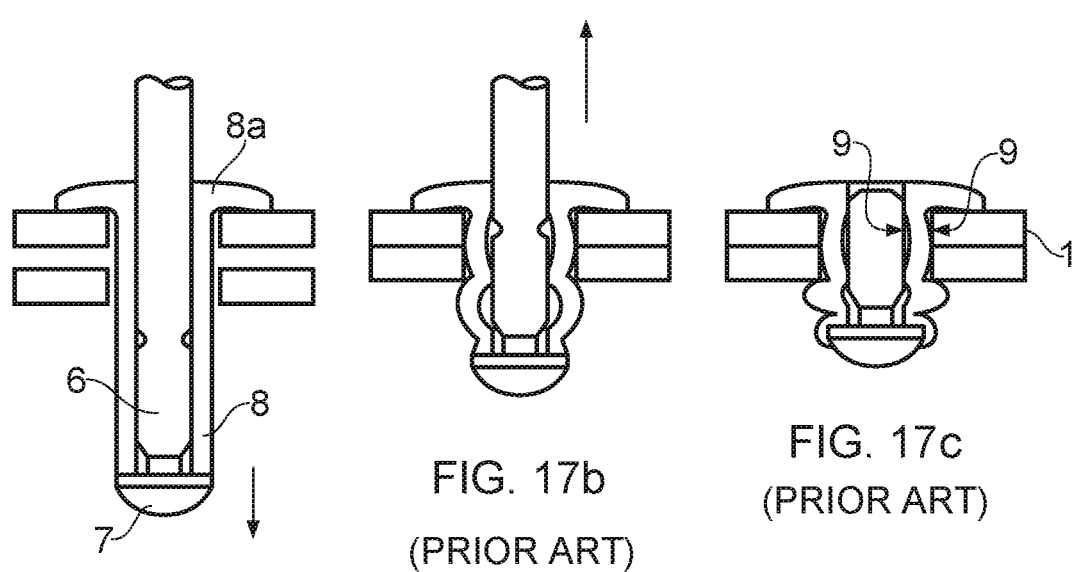
FIG. 17a
(PRIOR ART)
FIG. 17b
(PRIOR ART)
FIG. 17c
(PRIOR ART)

SPARK CONTAINMENT CAP

CROSS REFERENCE TO RELATED APPLICATIONS

This application is a Continuation of U.S. patent application Ser. No. 16/203,590, filed Nov. 28, 2018, now allowed, which claims priority to United Kingdom patent application GB 1719833.4, filed Nov. 29, 2017, the entire contents of each of which is hereby incorporated by reference.

FIELD OF THE INVENTION

The present invention relates to a spark containment cap. The present invention also relates to a fastening system, an aircraft comprising at least one of the spark containment cap and the fastening system, a method of securing a fastener and a spark containment cap to a structure. The present invention further relates to a spark prevention fastener, and an aircraft comprising the spark prevention fastener. The present invention also relates to a locating tool for locating a spark containment cap over an aperture in a structure.

BACKGROUND OF THE INVENTION

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightning attachment at any of the many metallic fasteners in the exterior surface, which have a much lower electrical resistance. In the wing, some of these fasteners pass through the outer wing skin into the fuel tank.

FIG. 1 is a side view of part of a fastener assembly passing through a panel 1, which may be a composite or metallic panel. The assembly comprises a fastener comprising an externally threaded bolt 2, an internally threaded nut 3, and a washer 4. In the event of a lightning strike hitting the panel 1 and attaching to the fastener, sparking, plasma or out-gassing may occur at the locations indicated by reference 5 in FIG. 1.

FIGS. 17a-17c are side views of another fastener passing through the panel 1, which may be a composite or metallic panel. The assembly comprises a blind rivet 5 comprising an axially extending shaft or mandrel 6, a head of the shaft 7, and a tubular collar 8 slidably fitted around the shaft 6. The collar 8 abuts the head 7 at one end and has a flange 8a at the other end. During installation, the blind rivet 5 is slid through an aperture in the panel 1 in the direction of the arrow shown in FIG. 17a until the flange 8a abuts the panel 1. The collar 8 is then held in position by the flange 8a against the panel 1, and the shaft 6 is drawn in the opposite direction in the direction of the arrow shown in FIG. 17b. By drawing the shaft 6 towards the held flange 8a, the collar 8 is compressed and urged to deform. The collar 8 therefore splays outwardly and forms an expanded portion on the opposing side of the panel 1 to the flange 8a, therefore acting as a fastener, as shown in FIG. 17c. The protruding portion of the shaft 6 is removable.

In the event of a lightning strike hitting the panel 1 and attaching to the fastener, sparking or plasma may occur at the locations indicated by reference 9 in FIG. 17c at the interface of the collar 8 and shaft 6, and the blind rivet 5 and face of the aperture.

With the above arrangements, the panel 1 may provide a fuel tank boundary and the fastener may therefore be immersed in fuel or fuel vapour rich gas. A lightning strike at the fastener may therefore provide sparking and hot gas ignition sources which could cause ignition of the fuel.

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

According to an aspect of the invention, there is provided a spark containment cap for forming a sealed cavity around an end of a fastener protruding from a structure, the cap comprising a cap body having an annular base terminating at a rim which surrounds an opening into an air cavity arranged to enclose the end of the fastener; an annular sealing volume extending around the rim arranged to receive a annular bead of a curable sealing material around the opening into the cavity to provide a seal between the cap body and the structure to seal a volume of gas within the cavity; and an engaging feature configured to engage with the end of the fastener to prevent rotation of the fastener relative to the cap when the end of the fastener is received by the cap.

With such an arrangement it is possible to use the cap to provide a reaction force during installation of the fastener. As such, following installation of the cap with a structure, it is possible to securely fasten the joint from one side of the structure. This reduces the need for access to both sides of the structure.

The engaging feature may be configured to engage with a drive feature of the fastener.

As such, it is a straightforward method to form a joint.

The engaging feature may comprise a locating face which is configured to locate against the drive feature.

The engaging feature may be configured to engage a hexagonal drive feature, a bi-hex drive feature and a spline drive feature at the end of the fastener.

The cap body may have an annular side wall, wherein the engaging feature may be on the annular side wall and may be configured to engage with a fastener side wall at the end of the fastener.

Air channels may be defined in the engaging feature.

The air channels help enable any out-gassing to circulate about the air cavity. Localised pressure build-up may be prevented.

The engaging feature may be formed in the annular side wall.

The engaging feature may form a shoulder in the air cavity.

The cap may comprise an annular skirt extending from the cap body to provide an annular sealing volume between the skirt and the annular base for containing the annular bead of the sealing material.

The cap body may comprise an inner cap member and the annular skirt may comprise a base of an outer cap member which fits over the inner cap member. The inner cap member may comprise the engaging feature.

The engagement feature may be configured to engage with an internally threaded fastening collar of the fastener. The internally threaded fastening collar may be a nut.

According to an aspect of the invention, there is provided a fastening system comprising a spark containment cap as set out above, and a fastener comprising a first fastening member and a second fastening member, the cap body being configured to receive the first fastening member so that the engaging feature engages the first fastening member, and the second fastening member being rotationally fastenable with the first fastening member.

The first fastening member may be a fastening collar. The fastening collar may be a nut.

The fastening collar may be retained by the cap. Hooks may retain the fastening collar in the cap.

The fastening system may further comprise a locating member configured to locate the fastening collar with respect to an aperture in the structure.

With this arrangement it is possible to correctly align the fastening collar and cap. This aids alignment of the fastening system. The arrangement helps hold the cap in correct alignment during curing of a sealant, and reacts against any pressure applied by the curable sealant.

The locating member may be a deformable member removably received through the internally threaded fastening collar and the aperture in the structure to hold the internally threaded fastening collar with respect to the aperture in the structure.

The fastening system may comprise an annular bead of uncured sealing material, the bead of sealing material being curable to provide a seal between the cap body and the structure to seal a volume of gas within the cavity.

The cap and sealing material may be configured such that the torque failure force of a cured sealing material between the cap body and the structure is greater than a predetermined fastening force of the fastener. The cap and sealing material may be configured such that the torque failure force of a cured sealing material between the fastener and the cap is greater than a predetermined fastening force of the fastener.

According to an aspect of the present invention, there is provided a joint comprising a structure; a fastener having a fastener end protruding from the structure; and a spark containment cap as set out above, the cap body of the spark containment cap being arranged over the fastener end so that the fastener end is enclosed within the air cavity, the engaging feature being arranged to engage with the end of the fastener to prevent rotation of the fastener relative to the cap, the cap comprising a cured sealing material in the annular sealing volume which secures the cap to the structure to thereby seal a volume of gas within the air cavity and prevent rotation of the cap relative to the structure.

The structure may comprise a boundary of an aircraft fuel tank.

According to an aspect of the present invention, there is provided an aircraft comprising one or more of a spark containment cap as set out above, a fastening system as set out above, and a joint as set out above.

According to an aspect of the present invention, there is provided a method of securing a fastener and a spark containment cap to a structure, the cap including a cap body having a cavity, and the method comprising disposing a spark containment cap with a first fastening member of the fastener retained in the cavity over an aperture in the structure; providing an annular bead of uncured sealing material between the structure and the cap; curing the bead of sealing material; and inserting a second fastening member of the fastener through the aperture and fastening the second fastening member with the first fastening member after the bead of sealing material is cured.

According to an aspect of the present invention, there is provided a spark prevention rivet for securing through an aperture in a structure, the rivet comprising an elongate stem with a head; and a sleeve extending around the elongate stem and slidable along the elongate stem; the stem having a tapered portion tapering inwardly away from the head; the sleeve having a structure locating feature and an internal tapered surface corresponding to the tapered portion; wherein, upon drawing the stem through the sleeve to draw the head towards the locating feature, at least part of the sleeve is caused to deform outwardly and at least part of the internal tapered surface of the sleeve forms an interference fit with the tapered portion of the stem.

With such an arrangement, it is possible to eliminate the formation of any gap or spacing between the stem and the sleeve when the rivet is fastened to the structure. The arrangement helps eliminate the presence of any gap or spacing between the surface of the aperture in which the rivet is received and the collar.

The internal tapered surface corresponding to the tapered portion may have the same angle of taper.

The maximum diameter of the tapered portion may be greater than the internal diameter of the internal tapered surface of the sleeve adjacent to the head.

As such, it is possible to help ensure that the interference fit is formed between the collar and the stem.

The sleeve may comprise a deformable section adjacent to the head, wherein the internal tapered surface extends at least part way between the deformable section and the structure locating feature.

The spark prevention rivet may comprise a collar section extending from the deformable section, configured to form an interference fit between the tapered portion of the stem and an internal surface of the aperture of the structure.

The collar section may be cylindrical. As such it is possible to easily form an interference fit between the collar and the surface of the aperture.

The maximum diameter of the tapered portion may be greater than or equal to the internal diameter of the internal tapered surface of the sleeve adjacent to the head.

A step may be formed between the deformable section and the collar section. This helps to limit the extent of the sleeve that is deformable in an axial direction.

At least part of the deformable section has an internal taper.

The angle of internal taper of the at least part of the deformable section may correspond to the tapered portion of the stem.

Upon drawing the stem through the sleeve, the tapered portion of the stem may be configured to act on the sleeve to cause at least part of the sleeve to distend outwardly.

The locating feature may be configured to abut the structure about the aperture through which the rivet extends.

The locating feature may be a countersink flange.

The diameter of the head may be less than or equal to the maximum diameter of the sleeve.

The stem may comprise a tool engaging section extending from the sleeve at an opposing end of the stem to the head.

A frangible joint may be formed between the tool engaging section and the remainder of the stem.

The rigidity of the stem may be greater than the collar.

According to an aspect of the present invention, there is provided a joint comprising a structure; and a spark prevention rivet as set out above; the spark prevention rivet being received through an aperture in the structure and forming an interference fit between the aperture and the rivet.

According to an aspect of the present invention, there is provided a locating tool for locating a spark containment cap over an aperture in a structure, the locating tool comprising a locating member receivable through the aperture, a cap connecting feature at an end of locating member, and a drawing arrangement arranged to draw the cap connecting feature towards the structure.

The cap connecting feature may be configured to connect directly with the cap.

The cap connecting feature may be configured to connect with part of a fastener retained by the cap.

The cap connecting feature may comprise an adhesive. The cap connecting feature may comprise a protrusion. The protrusion may be one or more of a head, a shoulder and a rib. The cap connecting feature may comprise a helical thread. The cap connecting feature may comprise a recess. The recess may be a groove.

The cap connecting feature may be selectably releasable from the cap.

The drawing arrangement may comprise a resilient element.

The resilient element may comprise at least part of the locating member.

The locating member may be an elastomeric shaft.

The drawing arrangement may be at the other end of the locating member to the cap connecting feature. Optionally, the drawing arrangement may be configured to act against the structure to draw the engaging feature towards the structure.

The drawing arrangement may be a fastening collar. Optionally, the fastening collar is a nut.

The locating member may be a shaft.

According to an aspect of the present invention, there is provided a fastening system comprising: a spark containment cap for forming a sealed cavity around an end of a fastener protruding from an aperture in a structure, and a locating tool configured to extend through the aperture to locate the spark containment cap over the aperture.

The locating tool may comprise a drawing arrangement arranged to draw the spark containment cap against the structure.

The locating tool may be selectably releasable from the spark containment cap in a longitudinal direction of the locating tool.

The spark containment cap may comprise a cap body having an annular base terminating at a rim which surrounds an opening into an air cavity arranged to enclose the end of the fastener. Optionally, the spark containment cap may comprise a tool connecting feature in the air cavity.

According to an aspect of the present invention, there is provided a method of locating a spark containment cap over an aperture in a structure, the method comprising: receiving a locating tool through the aperture; and drawing part of the locating tool through the aperture to draw a spark containment cap at one end of the tool against the structure.

The method may comprise providing an annular bead of uncured sealing material between the structure and the cap; and curing the bead of sealing material whilst the spark containment cap is drawn against the structure.

The method may comprise releasing the locating tool from the spark containment cap and withdrawing the locating tool from the aperture.

The method may comprise, following withdrawal of the locating tool from the aperture, inserting a fastener through the aperture so that an end of the fastener is received by the spark containment cap.

The fastener may be a blind fastener.

According to an aspect of the present invention, there is provided a spark containment cap for forming a sealed cavity around an end of a fastener protruding from a structure, the cap comprising: a cap body having an annular base terminating at a rim which surrounds an opening into an air cavity arranged to enclose the end of the fastener; an annular sealing volume extending around the rim arranged to receive a annular bead of a curable sealing material around the opening into the cavity to provide a seal between the cap body and the structure to seal a volume of gas within the cavity; and a tool connecting feature configured to connect with a locating tool received through an aperture in the structure.

The connecting feature may be at a distal end of the cap to the rim.

According to an aspect of the present invention, there is provided a joint comprising: a structure; a fastener having a fastener end protruding from the structure; and a spark containment cap comprising a cap body having an annular base which surrounds an opening into an air cavity enclosing the end of the fastener; a cured sealing material around the opening into the cavity to provide a seal between the cap body and the structure to seal a volume of gas within the cavity; and wherein the cap is spaced from the fastener.

With such an arrangement, the cap does not come into contact with the fastener.

The fastener may be a blind fastener.

The structure may comprise a boundary of an aircraft fuel tank.

According to an aspect of the present invention, there is provided an aircraft comprising one or more of a joint as set out above, and a spark prevention rivet as set out above.

BRIEF DESCRIPTION OF THE DRAWINGS

Embodiments of the invention will now be described with reference to the accompanying drawings, in which:

FIG. 5 is a partial cross-sectional side view of the fastening system of FIG. 3, part-way through the installation process with a fastener bolt prior to engagement;

FIG. 6 is a partial cross-sectional side view of the fastening system of FIG. 3 after installation;

FIG. 7 is a cross-sectional plan view of the fastening system of FIG. 3 with the cross-section shown through the fastener nut after installation;

FIG. 15 is a cross-sectional side view of another fastening system with a spark containment cap and locator part-way through installation;

FIG. 16 is a cross-sectional side view of the fastening system of FIG. 15 with a fastener installed;

FIGS. 17a-17c are cross-sectional side views of a prior art fastener joint showing installation;

DETAILED DESCRIPTION OF EMBODIMENT(S)

Figure 1:
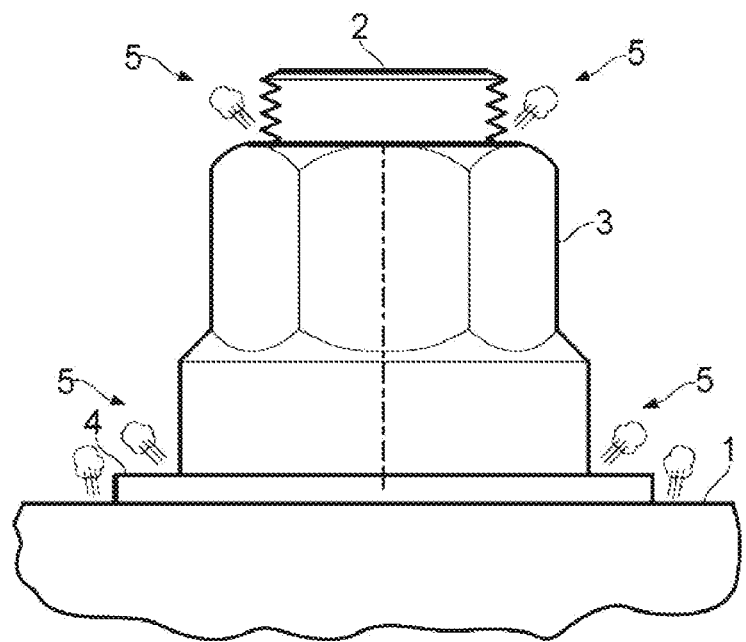
FIG. 1 is a side view of a prior art fastener joint.
Figure 2:
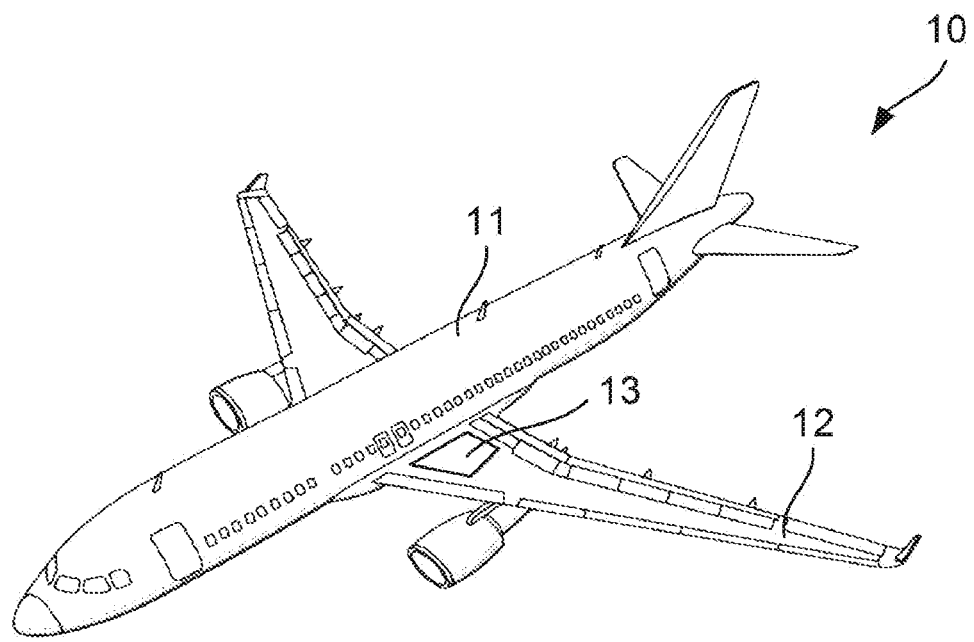
FIG. 2 is a perspective view of an aircraft.

An aircraft 10 is shown in FIG. 2. The aircraft 10 includes a fuselage 11. Two wings 12 extend from the fuselage 11. It will be appreciated that the fuselage 11 and wings 12 may take a variety of different planned formed shapes and profiles depending on the particular application. Fuel tanks 13 are formed in the fuselage 11 and wings 12. One such fuel tank 13 is schematically shown in FIG. 2. The fuel tanks 13 are formed by a structure or structures forming part of the aircraft 10.

FIGS. 3 to 7 show a joint 100 in stages of installation. Referring in particular to the installed joint 100 shown in FIG. 6, the joint 100 comprises a structure 110 such as an aircraft skin panel 110a joined to another component, such as another panel 110b. A fastener 120 extends through the structure 110. The structure 110 in this embodiment is a composite aircraft structural component, but may be a hybrid composite-metallic component. The fastener 120 extends through an aperture 113 in the structure 110.

An end 121 of a fastener 120 protrudes from the structure 110. The fastener 120 comprises a first fastening member 122 and a second fastening member 123. The first and second fastening members 122, 123 are engageable with each other to form the joint 100. As shown in FIGS. 3 to 6, the first fastening member 122 is a nut and the second fastening member 123 is a bolt. However, it will be understood that the fastener 120 may take alternative configurations. The second fastening member 123 comprises an axially extending shaft 124 which passes through the structure 110.

The nut, acting as first fastening member 122, has a bore 134. The nut 122 acts as a fastening collar. The bore 134 has an internal thread and the shaft has a corresponding external threaded section. The nut 122 is threadingly engageable on the shaft 124. The nut threadingly engages with the shaft 124 at the end 121 of the fastener 120. At another end of the fastener 120, the second fastening member 123 has a head 125 at the end of the shaft 124. The head 125 has a countersunk surface 126 for being received in a countersink 111 formed in the structure 110.

A washer 127 is received between the nut and the structure 110. The washer 127 has a spherical concave surface 128 which bears against a similarly shaped convex, underside, surface 129 of the nut, thus enabling the shaft 124 to extend at an acute angle to the surface 110 (rather than at a right-angle as in FIG. 6).

The bore 134 extends through the nut between the underside surface 129 of the nut and a top surface 135. The bore 134 defines a central longitudinal axis of the nut 122.

The fastener 120 has a drive configuration 130. The drive configuration 130 comprises features which enable the fastener 120 to be move from an unfastened condition to a fastened condition. The drive configuration 130 comprises a first drive feature 131 on the nut. A second drive feature 132 is on the second fastening member 123. Drive features are features on which a force may be applied to move at least one member relative to another member. The drive features act to retain a first member in a position and to move another member relative to the first member.

The nut has a hexagonal profile arrangement acting as the first drive feature 131. A side wall 133 of the nut has six drive faces. The drive wall 133 has a hexagonal arrangement. It will be understood that the nut 122 may have an alternative arrangement, such as a splined arrangement, forming the first drive feature 131. For example, the nut 122 may comprise at least one of a differing number of side faces, a recess and a slot acting as the first drive feature 131 in which a corresponding engaging feature 300, as will be described hereinafter, may be received. The engaging feature 300 is configured to act against the first drive feature 131 to apply a retaining torque force to prevent rotation of the nut 122.

The nut has a first, upper, section 136 and a second, lower, section 137. The underside surface 129 is on the second section 137. The first drive feature 131 is on the first section 136. The second section 137 is cylindrical. The diametrical width of the second section is greater than or equal to the width of the first section 136. A chamfered section 138 is formed between the first and second sections 136, 137.

The diameter of the washer 127 is less than the diameter of the second section 137 of the nut.

The second fastening member 123 has a profiled recess 135 acting as the second drive feature 132. The profiled recess 135 is configured to receive a tool (not shown) to apply a fastening torque to the second fastening member 123.

A cap 200 encloses the end 121 of the fastener 120. The cap 200 is a spark containment cap. The cap 200 has a cap body 201 with a domed outboard (upper) part 202 and a substantially cylindrical base 210. The base 210 forms an annular side wall. The substantially cylindrical base 210 terminates at a rim 211 which surrounds an opening into a central air cavity 212. The rim 211 lies in a plane so it can intimately engage with a planar surface of the structure 110 around its full circumference when the cap is fitted over the end 121 of the fastener 120 as shown. The cap 200 and fastener 120 together form a fastening system 380.

Hooks 250 are formed at the lower, inboard, end of the cap body 201. In the present embodiment the cap is formed with six hooks 250, however the number of hooks may differ. The hooks 250 are received as a snap-fit with the nut and locate against the underside surface 129 of the nut to retain the nut in the air cavity 212 when the fastening system 380 is at least partially assembled. The hooks 250 act on the lower side of the nut and retain the nut irrespective of its orientation about its central axis. The nut, acting as the fastening collar, is held by the cap 200. The hooks 250 hold the nut in the air cavity 212. The hooks 250 restrict the nut from being drawn from the cap 200. The hooks 250 act as a retention configuration.

The cap 200 has an engaging feature 300. The engaging feature 300 is formed in the air cavity 212. The engaging feature 300 is configured to engage with the nut 122. The engaging feature 300 extends in the air cavity 212. The engaging feature 300 comprises a shoulder 301 protruding in the air cavity 212. The cap abuts the shoulder 300. The cap body 202 and engaging feature 300 are integrally formed. The shoulder 302 protrudes from the annular side wall of the cap 200. The shoulder 301 extends from the upper end of the cap. The engaging feature 300 is spaced from the rim 211 of the annular base 210.

The engaging feature 300 comprises a locating face 302. The locating face 302 is configured to substantially correspond to the profile of the first drive feature 131 of the nut. As such, in the present embodiment, the locating face 302 has a substantially hexagonal profile. The locating face 302 has a plurality of opposing locating surfaces. However, it will be understood that the locating face 302 may have a differing arrangement in dependence on the arrangement of the drive feature with which the engaging feature 300 is configured to engage. The locating face 302 extends over corners of the first drive feature 131. In embodiments, the locating face 302 extends over at least one corner.

The engaging feature 300 encloses the first drive feature 131. The nut is slide-fit or push-fit in the engaging feature 300. The shoulder 302 has a lower edge 305. The lower edge 305 of the shoulder 302 is configured to abut against the chamfered section 138 of the nut to aid alignment of the nut in the cap 200.

Channels 304 are formed in the engaging feature 300 (refer to FIG. 7). The channels 304 extend from the locating face 302. In the present embodiment, the channels 304 extend parallel to a longitudinal axis of the cap body 202. The channels 304 extend in the locating surfaces of the locating face 302.

The engaging feature substantially corresponds with the first drive feature 131 of the nut. As described above, the engaging feature 300 is configured to engage a hexagonal drive feature of the nut. However, alternative arrangements are possible. The configuration of the engaging feature 300 may differ to correspond with an alternative fastener arrangement.

Figure 8:
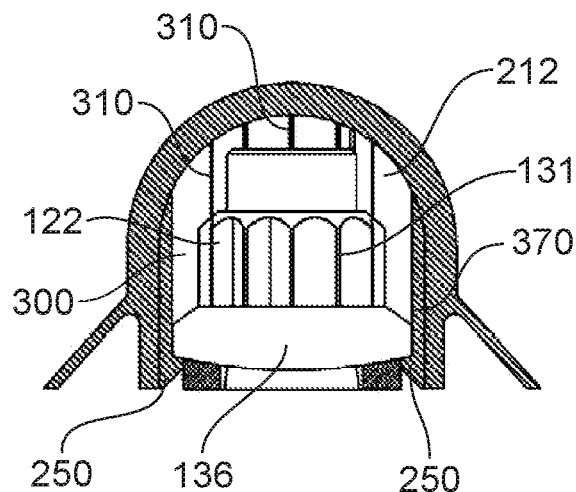
FIG. 8 is a partial cross-sectional side view of an alternative embodiment of the fastening system after installation.

FIG. 8 illustrates an alternative embodiment. In FIG. 8, the first drive feature 131 of the nut 122 is a bi-hex drive feature. The arrangement of the nut 122, acting as the first fastening member, is otherwise generally the same as described above. The engaging feature 300 comprises a plurality of ridges 310 which conform with and are received by the bi-hex drive feature when the nut 122 is received in the air cavity 212.

The cap body 201 is formed with six axially extending ribs 370. The ribs 370 project inwardly into the air cavity 212. The ribs 370 abut the cylindrical second section 136 as an interference fit. Although the ribs 370 are shown only in the embodiment shown in FIG. 8, they may be present in other embodiments or may be omitted. The hooks 250 at the lower, inboard, end of the cap body 201 protrude from the ribs 370.

Alternative drive features may be used, such as a spline drive feature.

Figure 9:
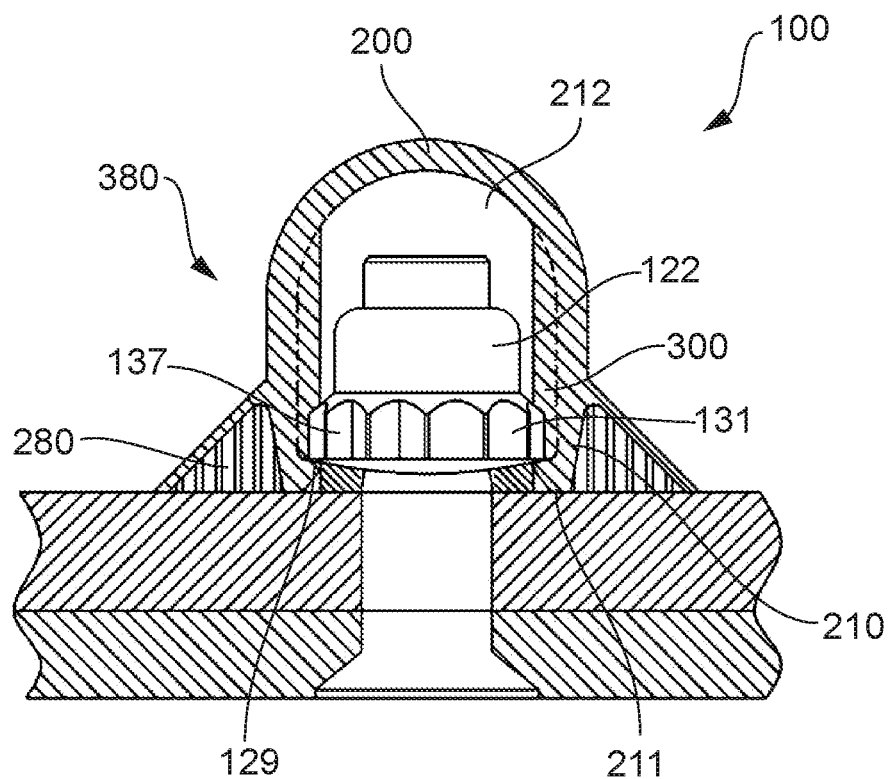
FIG. 9 is a partial cross-sectional side view of an alternative embodiment of the fastening system after installation.

FIG. 9 illustrates an alternative embodiment. In FIG. 9, the engaging feature 300 extends proximate the rim 211 of the first drive feature 131 of the nut 122 is disposed at the lower end of the cap 200. That is, proximate to the rim 211 of the annular base 210. The first drive feature 131 of the nut is on the second, lower, section 137. The first drive feature 131 extends to the underside surface 129. Such an arrangement helps to maximise the volume of the available air space in the air cavity 212 of the cap 200.

In each of the embodiments described above, an annular skirt 220 extends from an outboard (upper) end 221 where it meets the cap body to an inboard (lower) skirt rim 222 which lies substantially in the same plane as the rim 211 of the annular base 210. Like the rim 211, the skirt rim 222 also contacts the planar surface of the structure 110 around the full closed circumference of the skirt rim 222.

An annular pocket 240 is provided between the skirt 220 and the base 210. The annular pocket acts as an annular sealing volume. The pocket 240 extends from a closed outboard end 241 at the outboard end 221 of the skirt, to an open inboard end 242 at the skirt rim 222. Due to the flared shape of the outboard part 223 of the skirt, the pocket 240 has a radial width which increases as it extends from its outboard end 241 to its inboard end 242.

The skirt 220 has an injection channel 243. The injection channel 243 is arranged to interconnect with a sealing material injection device to provide a flow of sealing material through the skirt via the injection channel 243 into the pocket 240. A suitable sealing material is a polysulphide sealant such as Naftoseal (R) MC238B, MC238A, or MC780 available from Chemetall Group.

The skirt also has an outlet 244. The outlet 244 is in fluid communication with the pocket 240 and is arranged to enable air to escape the pocket 240 through the skirt via the outlet as the sealing material flows from the injection channel 243 into the pocket 240. When the pocket 240 is full, then the pressure in the pocket increases until it forces sealing material to escape the pocket through the skirt via the outlet 244. When this flow of sealing material out of the outlet 244 is visually observed, the flow of sealing material from the sealing material injection device is stopped. In embodiments, a gap may be formed about at least part of the skirt rim 222 to act as the outlet.

Alternative sealant arrangements may be provided to those shown. For example, the pocket may be prefilled with sealing material, or one part such as the annular skirt may be movable relative to another part, for example the cap body.

Once sealing material 280 is provided in the pocket 240, the sealing material 280 is then allowed to cure, leaving a cured sealing material in the pocket which secures the cap to the structure and forms a seal around the cavity 130. The sealing material forms an annular bead around the periphery of the cap 200, the bead of sealing material serving to seal the air cavity 212 in order to prevent escape of outgassing products, and to adhere the cap 200 to the structure 110. The seal prevents the ingress of water or other contaminants into the cavity 230, and also prevents plasma or other out-gassing products from exiting the cavity 230 in the event of a lightning strike.

All parts of the cap 200 are integrally formed by injection moulding or similar. A suitable material is a glass filled polyetherimide (PEI) resin such as Ultem 2400 or Ultem 2310, available from SABIC Innovative Plastics Holding BV, or Nylon PA6, PA66 or PA12.

Figure 3:
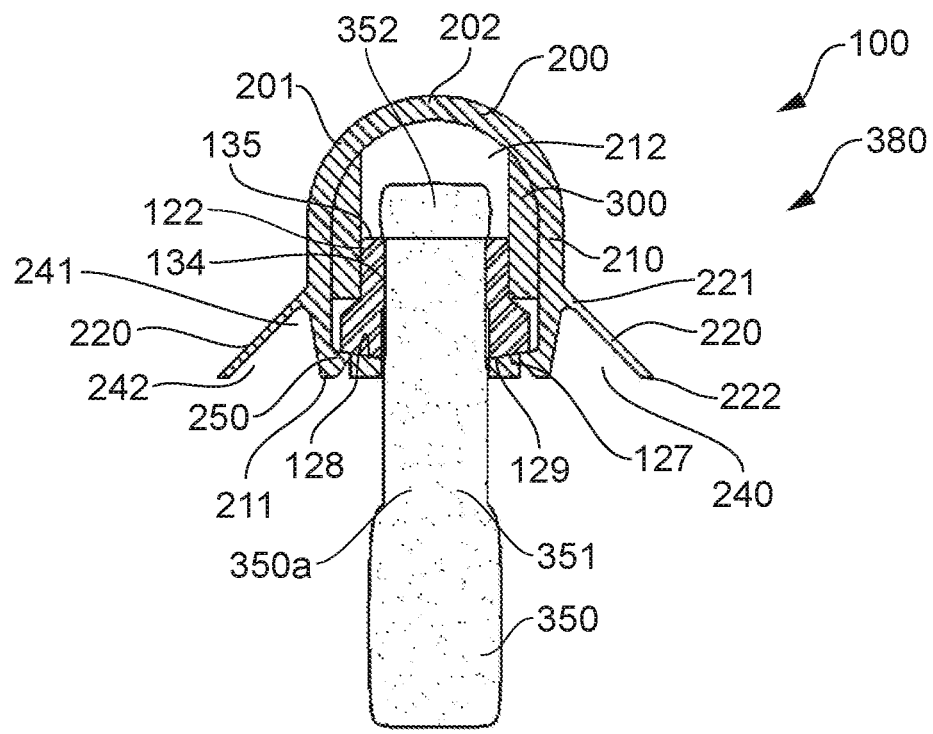
FIG. 3 is a cross-sectional side view of a fastening system with a spark containment cap, fastener nut and locator prior to installation.
Figure 4:
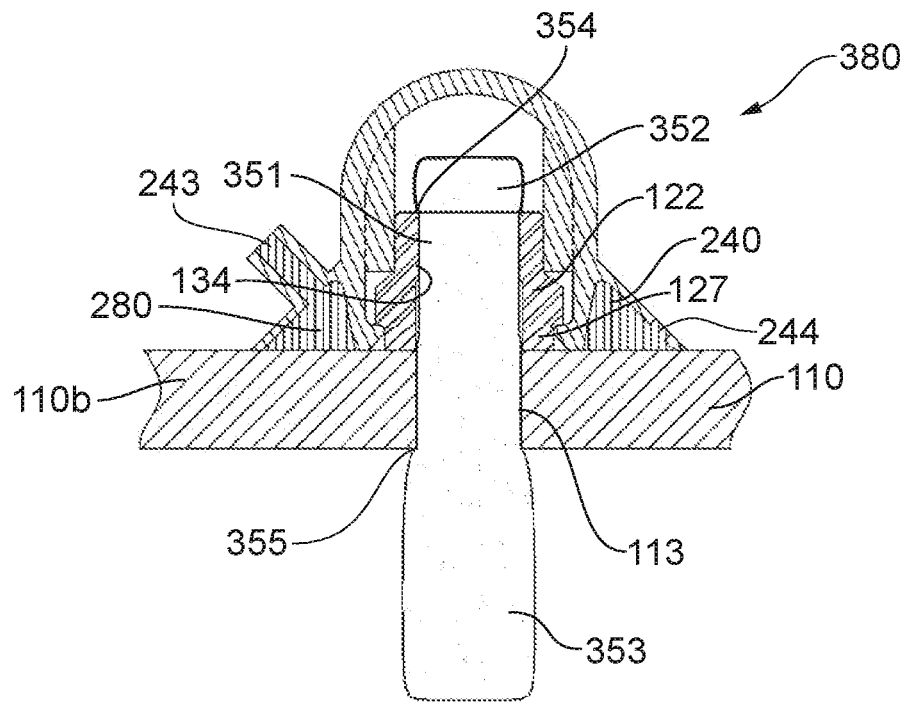
FIG. 4 is a cross-sectional side view of the fastening system of FIG. 3 from a different side, part-way through the installation process.

The fastening system 380 includes a locator 350 as shown in FIGS. 3 and 4. The locator 350 acts as a locating tool. The locator 350 is configured to locate the cap 200 over the aperture 113 in the structure 110. The locator 350 acts as a locating tool. The locator 350 comprises a locating member 350a. The locating member 350a is configured to locate in the aperture 113 to align the cap 200 over the aperture 113. The locator 350 is formed from a resilient material, such as an elastomer. The locator 350 has a neck portion 351. The neck portion 351 forms the locating member 350a. The locating member 350a is a deformable member, and may form an elastomeric shaft. The neck portion 351 is elongate and extends from a locator head 352. The locator head 352 acts as a cap connecting feature. The locator head 352 is configured to connect with the nut 122, acting as the fastening collar, which is received by the cap 200. The nut 122 acts as a connecting feature connecting the locator 350 with the cap 200. The locator head 352 engages with the nut to form a releasable connection. The diameter of the neck portion 351 is less than the diameter of the head 352. A head step 354 is formed between the neck portion 351 and the head 352.

A handle portion 535 is formed at an opposing end to the neck portion 351 to the locator head 352. The handle portion 353 extends from the neck portion 351. A handle step 355 is formed between the neck portion 351 and the handle portion 353. The diameter of the neck portion 351 is less than the diameter of the handle portion 353 in an undeformed state. In an alternative embodiment, as will be described below, the neck portion 351, acting as the locating member 350a, has a diameter equal to or greater than that of the handle portion 353. The diameter of the neck portion 351 corresponds to the diameter of the bore 134 of the nut 122. The head 352 is insertable through the bore 134 of the nut 122, and is deformable to expand to abut the nut top surface upon being urged through the bore 134. The head portion 352 is sized to be receivable in the air cavity 212 of the cap 200. The neck portion 351 is deformable in a longitudinal direction. When the locator 350 is drawn in a longitudinal direction, the diameter of the neck portion 351 contracts. Similarly, the diameter of the handle portion 353 contracts. The contraction of the neck portion 351 and handle portion 353 is configured to be sufficient to allow the neck portion 351 and handle portion 353 to be inserted through the aperture 113.

The length of the neck portion 351 substantially corresponds to the height of the nut 122, the washer 127 and the length of the aperture 113 through which the fastener 120 is configured to extend.

Figure 10:
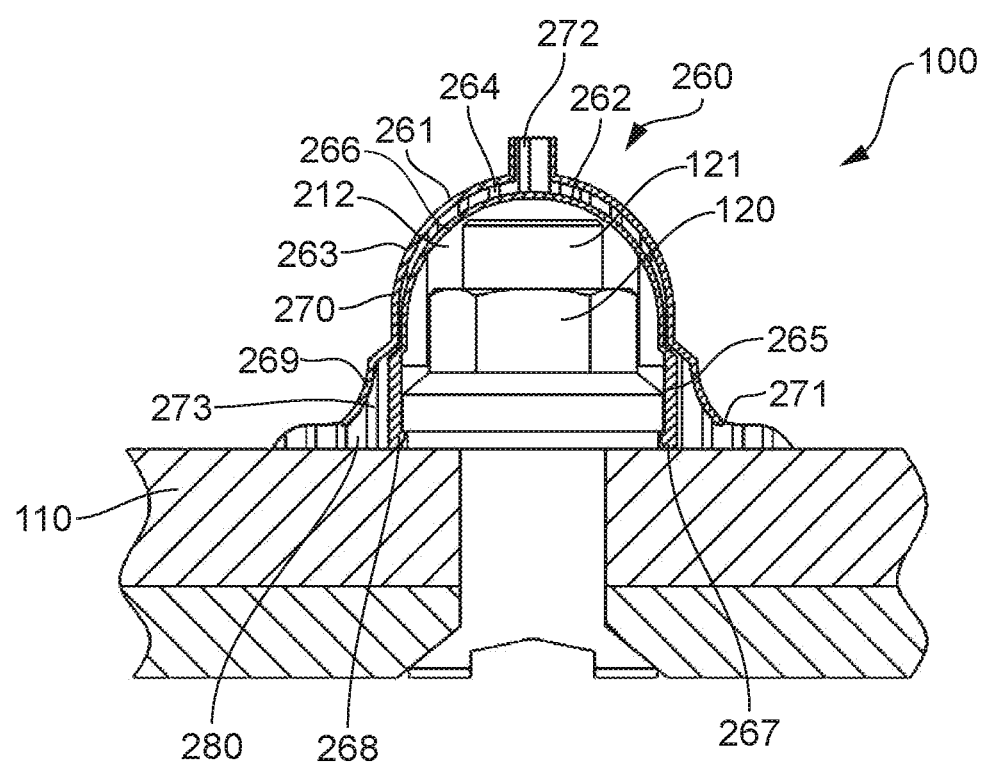
FIG. 10 is a partial cross-sectional side view of an alternative embodiment of the fastening system after installation.

FIG. 10 illustrates an alternative arrangement, in which the annular sealing volume of the cap is alternatively formed. In FIG. 10, the fastener 120 is generally the same as the fastener described above for FIGS. 3 to 7, however it will be understood that alternative fastener arrangements may be used. A cap 260 comprises a two-part cap body 261 having an inner cap member 262 and an outer cap member 263. The inner cap member 261 is a generally thin-walled dome-shaped member, defining the air cavity 264 which encloses the end 121 of the fastener 120 protruding from the structure.

The inner cap member 262 comprises an annular base 265 which has a generally cylindrical outer surface, and a domed portion 266. An outer diameter of the inner cap member 262 reduces so the domed portion 266 has a smaller outer diameter than the annular base 265.

A rim 267 of the annular base 13 abuts the structure 110 to fully encapsulate the end 121 of the fastener 120 within the air cavity 212. Hooks 268 provide a mechanical connection between the inner cap member 262 and the nut 122.

The outer cap member 263 is also a generally thin-walled dome shaped member, and is shaped to fit over the inner cap member 262 so that an annular sealing volume 273 is defined therebetween. The outer cap member 263 is generally made up of an annular skirt 269 and a smaller diameter domed portion 270. The annular skirt 269 has a flared lip 271 at its free edge. An injection channel 272 is provided in fluid engagement with the sealing volume. The injection channel is omitted in an arrangement, with the inner and outer cap members being movable relative to each other and uncured sealing material being compressible therebetween.

The annular sealing volume 273 is open at its lower face such that sealing material 280 can flow outwardly from the annular sealing volume 273 and into contact with the structure 110. The sealing material then forms an annular bead around the periphery of the nut cap 200, the bead of sealing material serving to seal the air cavity 212 in order to prevent escape of outgassing products, and to adhere the nut cap 200 to the structure 110.

Referring now to FIGS. 3 to 7, installation of the fastening system 380 to form the joint 100 will now be described. During installation, the nut 122, acting as the fastening collar, and the cap 200 are assembled. The nut 122 is retained in the cap 200. When the nut 122 is received in the cap 200, the engaging feature 300 abuts with the first drive feature 131. The nut and cap 200 are assembled with the locator 350 and the washer 127 as shown in FIG. 3. In the present arrangement, the locater 350 is fitted to the nut; by stretching the locator 350 and sliding the nut onto it, prior to the cap 200 being assembled.

The panels 110a, 110b are brought together and the aperture 113 and countersink 111 are formed. One of the panels 110a is then removed. As shown in FIG. 4, the assembled nut, washer 127 and cap 200 are located over the aperture 113 in the structure 110. The locator 350 locates the nut, washer 127 and cap 200. The locator 350 is inserted through the aperture 113. Due to the resilience of the locator 350, the nut is drawn towards the structure 110. The washer 127 is disposed therebetween. The cap 200 encloses the nut and washer 127 and one side of the aperture. The handle portion 353 of the locator 350 protrudes from an opposing side of the structure. The washer 127 may be omitted. The nut 122 is retained by the cap 200. When the locator 350 acts on the nut 122 to draw the nut 122 towards the structure 110, the cap is drawn towards the structure 110. The nut 122 acts against the hooks 250 and is drawn in an axial direction by the action of the locator 350.

To locate the cap 200 over the aperture 113 in the structure 110, the assembled cap 200 and locating tool 350 are assembled with the panel 110b. An elongate guide (not shown) is inserted through the aperture 113. The elongate guide extends from the handle portion 353. The handle portion 353 is then drawn through the aperture 113 using the guide member. The nut 122 is drawn towards the structure 110 such that the cap 200 is drawn towards the structure 110. The rim 211 locates against the surface of the structure 110 and is in abutment with the surface around its diameter. The neck portion 351 engages with the aperture 113 and the handle portion 353 is released so that the shaft part in the sealed cavity 462 is in tension. As such, the neck portion 351 acts as a drawing arrangement, arranged to draw the head 352 towards the structure 110. The head 352 therefore biases the cap 200 against the structure 110.

Pre-mixed sealing material 280 is then injected into the annular sealing volume 240. When the annular sealing volume 240 is full it overflows, causing an evenly distributed flow of sealing material 280. The sealing material 280 completely fills the annular sealing volume 240 until it flows into contact with the structure 110.

The curable sealing material 280 is left to cure. On curing, it provides a strong adhesive bond between the cap 200 and structure 110. The sealing material 280 may cure to handling strength (i.e. a degree suitable to provide sufficient strength to withstand knocks or similar from assembly workers) in approximately 40 minutes for epoxy-based adhesive sealing materials, one hour for polythioether sealants, or over four hours for polysulphide sealants.

During cure of the sealing material 280 (or at least until the sealing material is partially cured) the locator 350 is left in position. The locator 350 draws the nut and cap 200 against the surface of the structure 110. Once the sealing material 280 has cured, or at least partially cured, the structure 110 may be further assembled with other structures, such that access to the side of the structure 110 with the cap 200 is restricted.

Once the sealing material 280 has fully cured, the locator 350 is withdrawn. The head 352 is deformable when a withdrawal force is exerted on the locator 350 from the underside of the panel 110b to release the head 352 from the nut 122 and draw the head through the aperture 113. It will be understood that the locator 350 may be omitted in some arrangements. The deformity of the locator 350 provides for the locator 350 to be easily removed. The cap 200 is securely fixed with the structure, and the nut is securely engaged with the cap 200. As such, a rigid formation is formed between the structure 110, the cap 200 and the nut.

Upon removal of the locator 350, the panels 110a, 110b are brought together, and the second fastening member 123 is inserted through the aperture 113 in the structure 110 as shown in FIG. 5. The free end of the second fastening member 123 is brought into contact with the nut. The free end of the second fastening member 123 passes through the washer 127. Upon contact with the nut, acting as the nut 122, a drive torque is applied to the second fastening member 123 through means of the second drive feature 132. The drive torque cause rotation of the bolt, acting as the second fastening member 123 relative to the nut 122. The bolt engages with the nut, through threaded engagement. As a torque is applied through the fastener 120, a reaction force acts on the nut 122. The fixed cap 200 reacts against the nut 122 through the engaging feature 300 to prevent rotation of the nut 122. As such a fastening torque may be applied to the fastener 120.

The adhesion strength of the sealant adhering the cap 200 and the strength of engagement of the nut and cap 200 are configured to overcome the reaction forces exerted onto the nut in reaction to the locking torque when the second fastening member 123 is tightened. In embodiments, the nut has a locking feature (not shown). The reaction forces are configured to exceed the locking torque caused by the friction generated by the locking feature of the nut. As the fastener is tightened the clamping pressure exerted onto the structure 110 will overcome a significant portion of the reaction torque. With the above described arrangement, it is possible to mount a fastener and spark containment cap without the need to apply a manual fastening torque to both sides of the fastener.

In embodiments, a chemical locking feature, such as a curable adhesive, is applied between the first and second fastening members. This helps prevent the need for a mechanical locking feature to be provided and so minimises the reaction force applied to the cap upon fastening the fastener.

FIGS. 11 to 14 show an alternative spark containment cap assembly system 400. The spark containment cap assembly system 400 is used to form the joint 401. The joint 401 comprises a structure 410 such as an aircraft skin panel 410a joined to another component, such as another panel 410b. The joint 401 includes a fastener 420 and a cap 450. A locator 500 acts as a locating tool. The locator 500 acts to locate the cap 450 over an aperture 413 in the structure 410 during assembly of the joint 401. A number of the features of the structure 410, the fastener 420, the cap 450 and the locator 500 correspond to features of components described in the above embodiments. As such, a detailed description of common features will be omitted below. In the embodiment described below, the fastener 420 does not engage with the cap 450 such that relative movement is restricted between the components. In embodiments, an end 421 of the fastener 420 is spaced from the cap 450.

The end 420 of the fastener 420 protrudes from the structure 410. The fastener 420 comprises a first fastening member 422 and a second fastening member 423. The first and second fastening members 422, 423 are engageable with each other to form the joint 100. The fastener 420 is a blind fastener. As such, the fastener 420 can be inserted and fully installed in the aperture 413 from only one side of the structure 410, "blind" to the opposite side of the structure 410. As shown in the Figures, the fastener 420 is inserted from the side of the aperture 13 which has a countersink 414. In embodiments, the fastener 420 is a blind rivet.

The cap 450 encloses the end 421 of the fastener 420 when the fastener 420 is engaged through the aperture 413. The cap 450 is aligned with and encloses one end of the aperture 413. The cap 450 has a cap body 451 with a domed outboard (upper) part 452 and a substantially cylindrical base 460. The base 460 terminates at a rim 461. The rim 461 surrounds an opening into a central air cavity 462. The central air cavity 462 forms a sealed cavity upon assembly of the joint 401.

Figure 12:
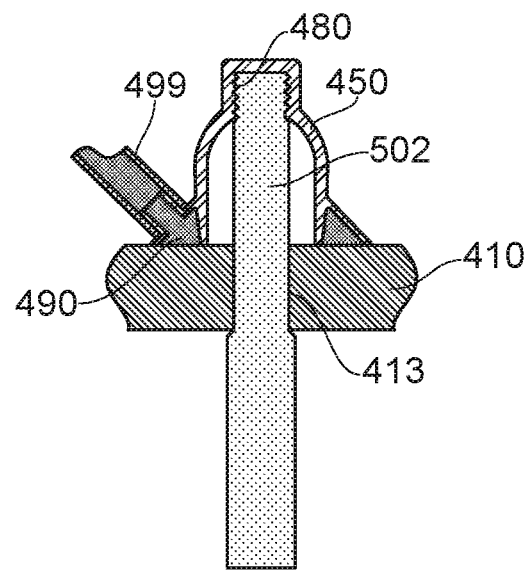
FIG. 12 is a cross-sectional side view of the fastening system of FIG. 11 part-way through installation.

An annular skirt 470 extends from an upper end junction with the cap body 451 to an inboard (lower) skirt rim 470 which lies substantially in the same plane as the rim 451 of the annular base 460. An annular pocket 490 acting as an annular sealing volume is provided between the skirt 470 and the base 460. The annular pocket 490 has an injection channel 493. The annular pocket 490 has an outlet (not shown). A sealing material injection device 499 is used to inject a suitable sealing material into the annular pocket 490 as shown in FIG. 12. The sealing material injected into the annular pocket 490 forms an annular bead of curable sealant material.

Alternative sealant arrangements may be provided to those shown. For example, the pocket may be pre-filled with sealing material, or one part such as the annular skirt may be moveable relative to another part, for example the cap body. The cap 450 may be a two part cap instead of the one part cap shown in the figures, with sealant being received between the two parts of the cap.

The cap 450 comprises a locating tool connecting feature 480. The locating tool connecting feature 480 is configured to connect with the locator 500. The locating tool connecting feature 480 is in the cavity 462. The locating tool connecting feature 480 is formed by a wall of the cap body 451. The locating tool connecting feature 480 is formed about a longitudinal axis of the cap 450. The locating tool connecting feature 480 is at the domed end 452 of the cap 450. Engaging ridges 481 form the locating tool connecting feature 480. The engaging ridges 481 extend circumferentially at the closed end of the cavity 462. The locating tool connecting feature 480 is at the distal end of the cap body 451 to the rim 461. As such, the locating tool connecting feature 480 is configured to be spaced, and so not interfere, with the fastener 420 upon assembly of the joint 401.

The locating tool connecting feature 480 may have different forms, and for example, may include one or more of an adhesive, a protrusion, such as a ridge, a head (as described above), a shoulder, a ridge and a recess.

The locator 500, acting as the locating tool, is initially assembled with the cap 450 prior to bringing the cap 450 together with the structure 410. As such, the cap 450 and locator 500 are pre-assembled.

The locator 500 comprises a cap connecting feature 501 and a locating member 502. The cap connecting feature 501 is at one end of the locating member 502. The locating member 502 is elongate. The locating member 502 is configured to be received through the aperture 413 in the structure 410. In the present embodiment, the locating member 502 is a deformable member which may be manipulated into an extended elongated form to reduce the diameter of the locating member 502 when deformed to have a diameter which is less than the diameter of the aperture 413. In an undeformed condition, the locating member 502 has a diameter which is greater than the diameter of the aperture 413 formed in the structure 410. When assembled with the cap 450, the locating member 502 of the locator 500 extends from the opening to the cavity 462. The extension of the locating member 502 from the cavity 462 is greater than the length of the aperture 413 over which the cap 450 is to be located. The locator 500 is formed from a suitable material such as an elastomeric material.

The cap connecting feature 501 is configured to connect with the locating tool connecting feature 480 of the cap 450. The cap connecting feature 501 connects directly with the cap 450. The cap connecting feature 501 has a plurality of ridges 505. The cap connecting feature 501 corresponds with the locating tool connecting feature 480. In embodiments, the cap connecting feature 501 includes, for example, one or more of a recess, such as a channel, a shoulder, a rib, a helical thread, and a protrusion. The cap connecting feature 501 and the locating tool connecting feature 480 may together be a single feature such as a releasable adhesive. The releasable adhesive may be at the end of the locator 500.

The locator 500 is releasable from the cap 450. The locator 500 is releasable in response to a release force being exerted on the locator 500 to draw the locator 500 away from the cap 450. That is, to draw the locator 500 out of the cavity 462. The release force is configured to be greater than the deformation force required to deform the locating member 502.

Figure 11:
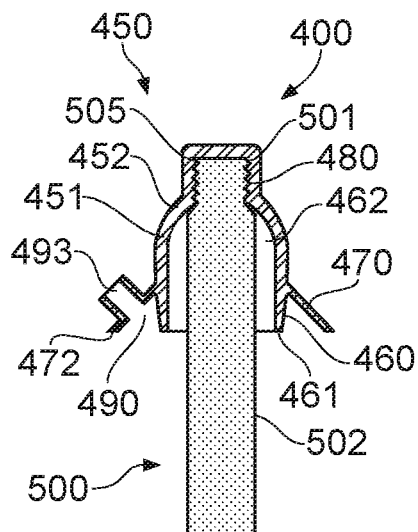
FIG. 11 is a cross-sectional side view of another fastening system with a spark containment cap and locator prior to installation.

Assembly of the joint 401 will now be described. The cap 450 and locator 500 assembly is assembled as shown in FIG. 11. The cap 450 is aligned with the aperture 413 in the structure 410 and the locating member 502 of the locator 500 is drawn through the aperture 413. A guide member (not shown) may extend from the free end of the locator 500 which has a smaller diameter than the locating member 502 and is insertable through the aperture 413 to align the locating tool 500 with the aperture 413, and aid the locating member 502 to be drawn through the aperture 413.

By drawing the free end of the locating member 502 away from the cap 450, the locating member 502, acting as a deformable member, deforms such that the diameter of the locating member 502 decreases and is receivable through the aperture 413. When the free end of the locating member 502 is drawn through the aperture 413, the locating member 502 is further drawn through the aperture 413 to draw the cap 450 against the structure 410. The rim 461 of the cap 450 locates against the structure 410 and the locator 500 retained by the cap 450 biases the cap 450 against the structure. When the free end of the locating member 502 is released, the section of the locating member 502, acting as a deformable member, in the cavity 462 is retained in tension and so draws the cap 450 against the structure 410.

The released free end of the locating member 502 is biased towards an undeformed state due to its resilience and so engages with the aperture 413 and the underside of the structure 410 to retain the cap 450 in position. The locating member 502 therefore acts as a drawing arrangement to draw the cap 450 against the structure 410. The cap 450 is therefore biased against the structure 410, with the rim 461 in abutment against a surface of the structure 410. As the release force required to disengage the locating tool connecting feature and the cap connecting feature is greater than that required to deform the locating member 502, the locator 500 is retained in connection with the cap 450.

When the cap 450 is in the biased condition, uncured sealing material is injectable into the annular sealing volume 490. The pressure of injecting sealing material into the annular sealing volume 490 as shown in FIG. 12 is counteracted by the biasing force applied by the locator 500. As such, the rim 461 is retained in abutment with the structure 410. Sealant therefore does not flow into the cavity 462.

Once an annular bead of uncured sealing material is received by the cap 450, the sealing material may be cured to affix the cam 450 to the structure 410 as shown in FIG. 12.

Figure 13:
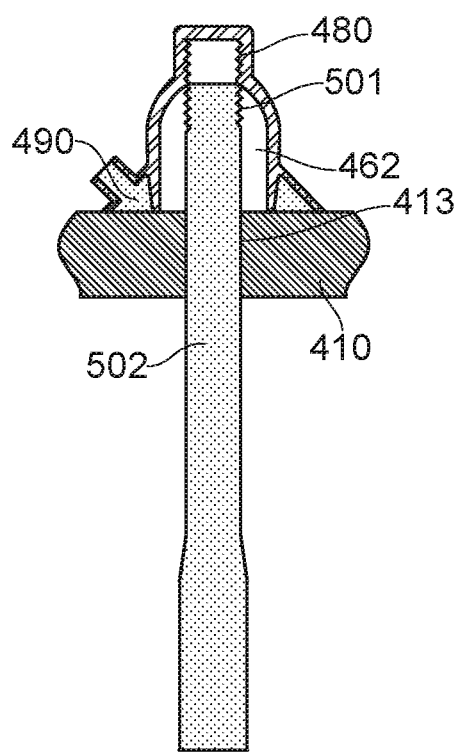
FIG. 13 is a cross-sectional side view of the fastening system of FIG. 11 during removal of the locator.
Figure 14:
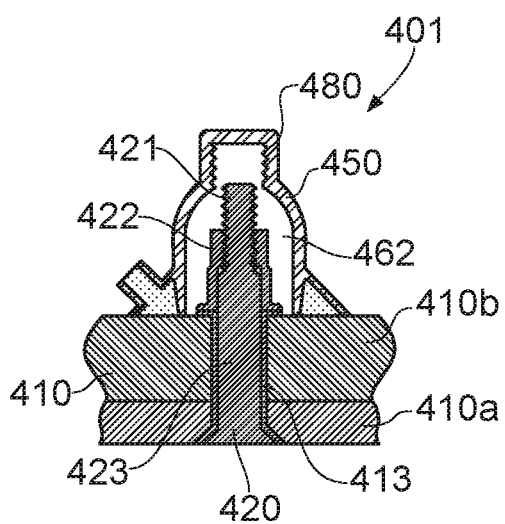
FIG. 14 is a cross-sectional side view of the fastening system of FIG. 11 with a fastener installed.

Once the sealing material is cured, and the cap 450 is fixably adhered to the structure 410 by the sealing material, a withdrawal force is applied to the locator 500. The free end of the locating member 502 is drawn away from the structure 410 in a direction to bias the locating member 502 to move through the aperture 413 and out of the cavity 462. A withdrawal force greater than the connecting force between the cap 450 and the locator 500 is applied so that the cap connecting feature 501 disengages from the cap 450. Such a condition is shown in FIG. 13. The locator 500 may then be fully withdrawn from the cap 450 and structure 410. The locator 500 may be discarded or re-used on another cap.

A sealed cavity is therefore formed between the cap 450 and the structure 410. The joint 401 may then be fully assembled by inserting the blind fastener 420 through the aperture 413 from an opposing side of the structure 410 to the cap 450. The blind fastener 420 is engaged to form the joint 401. With such an arrangement, the joint 401 may be formed during final assembly with access to only one side of the structure 410. By providing the locating tool connecting feature 480 at the distal end of the cap 450 it is possible to ensure that the cap does not interfere with the fastening of the fastener 420.

In FIGS. 15 and 16 another embodiment of the spark containment cap assembly system 550 is shown. The system 550 shown in FIGS. 15 and 16 generally corresponds to the system 400 shown in FIGS. 11 to 14. As such, a detailed description will be omitted herein. The arrangement is generally the same and includes a cap 560, a structure 570, a fastener 580 and a locator 590. The dimensions of the cap 560 and locator 590 differ from those shown in FIGS. 11 to 14; however the features of the cap 560 generally correspond to those of the cap 560. The locator 590 differs in that a fastening collar 591 is utilised as a drawing arrangement to draw a locating member 592 through an aperture 571 in the structure 570 and to bias the cap 560 against the structure 570. The cap 560 includes a rim 561 around an opening to an air cavity 562. A locating tool connecting feature 565 is at a distal end of the cap 560 to the rim 561. The locating tool connecting feature 565 may have differing arrangements as described above.

The locator 590, acting as the locating tool, comprises the locating member 592 and the fastening collar 591. The locating member 592 is elongate. A cap connecting feature 593 is at one end of the locating member 592. The fastening collar 591 is at a distal end of the locating member 592 to the cap connecting feature 593. The locating member 592 is a shaft with the cap connecting feature 593 connecting with the cap 560. The locating member 592 protrudes from the cavity 562 of the cap 560. The diameter of the locating member 592 is configured to be less than or equal to the diameter of the aperture 571 in the structure 570.

The fastening collar 591 is movably engaged with the free end of the locating member 592. The fastening collar 591 is a nut, such as a wing nut, which is threadingly engaged with the locating member 592. The fastening collar 591 is removable from the locating member 592. The fastening collar 591 acts as the drawing arrangement. In such an arrangement, the locating member may be rigid. As such, there is no need for a deformable member. However, it will be understood that embodiments may include the fastening collar and a deformable portion.

To assemble the joint, the assembled cap 560 and locator 590 are aligned with the aperture 571 in the structure 570. The fastening collar 591 is absent from the locating member 592. The distal end of the locating member 592 is inserted through the aperture 571. The locating member 592 protrudes from the aperture on an opposing side to the cap 560. The fastening collar 591 is releasably engaged with the locating member 592 and is further engaged to draw the locating member 592 in a direction through the aperture 571. As such, the cap 560 is moved into abutment with the structure 570 over the aperture 571. The fastening collar 591 is engaged until the rim 561 is biased against the structure 570.

As described above, sealing material is then inserted into an annular sealing volume 564 of the cap 560 and cured. An annular bead of cured sealing material is then formed to affix the cap 560 to the structure 570. A withdrawal force is then imparted on the locator 590 to disengage the locating member 592 from the cap 560. The locating member 592 is then drawn through the aperture 571 to remove the locator 590. The locator 590 is reuseable. As shown in FIG. 16, the blind fastener 580 may then be inserted through the aperture 571 and engaged to form the joint.

Referring now to FIGS. 18 to 21, an alternative fastener will now be described. FIGS. 18 to 21 show a joint 600 in stages of installation. The joint 600 comprises a structure 610 such as an aircraft skin panel 610a joined to another component, such as another panel 610b. A fastener 620 extends through the structure 610. The structure 610 in this embodiment is a composite aircraft structural component, but may be a hybrid composite-metallic component. The fastener 620 is inserted through an aperture 611 in the structure 610. A countersink 612 is formed at one end of the aperture 611. The fastener 620 is a rivet. In particular, the fastener 620 is a blind-rivet. That is, the fastener can be inserted and fully installed in the aperture 611 from only one side of the structure 610, "blind" to the opposite side of the structure 610. As shown in the Figures, the fastener 620 is inserted from the side of the aperture 611 having the countersink 612.

The fastener 620 comprises a mandrel 630 and a sleeve 640. The sleeve 640 is deformable about the mandrel 630 to form the joint 600. The mandrel 630 is formed from a material with a higher rigidity than the sleeve 640. For example, the mandrel 630 is formed from a steel or stainless steel, and the sleeve 640 is formed from monel or aluminium.

The mandrel 630 comprises an elongate stem 631. A head 632 is at one end of the elongate stem 631. The stem 631 and head 632 are integrally formed, or may be formed as separate but joined components. The stem 631 forms an axially extending shaft. The stem 631 has a sleeve engaging section 633 and a tool engaging section 634. The tool engaging portion 634 is at an opposing end of the stem to the head 632. A frangible joint is formed between the tool engaging section 634 and the sleeve engaging section 633. The stem is configured so that the force required to break the frangible joint is greater than the force required to deform the sleeve 640. The tool engaging section 633 has a ridged surface 635 to aid engagement with a drawing tool (not shown).

The elongate stem 631 has a tapered portion 636 tapering inwardly away from the head 632. The sleeve engaging section 633 forms the tapered portion 636. The tapered portion 636 is an external taper which tapers along the longitudinal length. The head 632 forms an abutment 637 against which the sleeve 640 abuts. The head 632 has a diameter equal to or less than the diameter of the aperture 611 through which it is receivable.

The sleeve 640 extending around the elongate stem 630. The sleeve is slidable along the elongate stem 630 in an unfastened condition. The sleeve 640 has a countersink flange 641 at one end. The countersink flange 641 acts as a structure locating feature. That is, the countersink flange 641 is locatable against the structure 610 when the fastener 620 is received in the aperture 611 to restrict movement of the sleeve 640 in the longitudinal direction. The countersink flange 641 is configured to be received in the countersink 612.

The sleeve 640 has a deformable section 642 at a free end 644 of the sleeve 640 from the countersink flange 641. A collar section 643 is between the deformable section 642 and the end of the sleeve 640 with the countersink flange 641. The sleeve 640 is cylindrical in its undeformed condition. The diameter of an external cylindrical surface 645 of the sleeve 640 is configured to correspond to the diameter of the aperture 611 in which the sleeve 640 is receivable. The length of the collar section 643 is configured to correspond to the length of the aperture 611.

The sleeve 640 has an internal taper. An internal tapered surface 646 of the sleeve 640 is defined along the sleeve 640. The internal tapered surface 646 in the present arrangement extends along the collar section 643. The taper 648 of the internal tapered surface 646 corresponds to the taper of the tapered portion 636 of the stem 631. The angle of taper of the internal tapered surface 646 conforms with the angle of taper of the tapered portion 636 of the stem 631. The maximum diameter of the tapered portion 636 is greater than the internal diameter of the internal tapered surface 646 of the sleeve 640.

The deformable section 642 of the sleeve 640 has an internal taper. The angle of internal taper of the deformable section 642 corresponds to the tapered portion 636 of the stem 631. A step 647 is formed between the deformable section 642 and the collar section 643.

Figure 18:
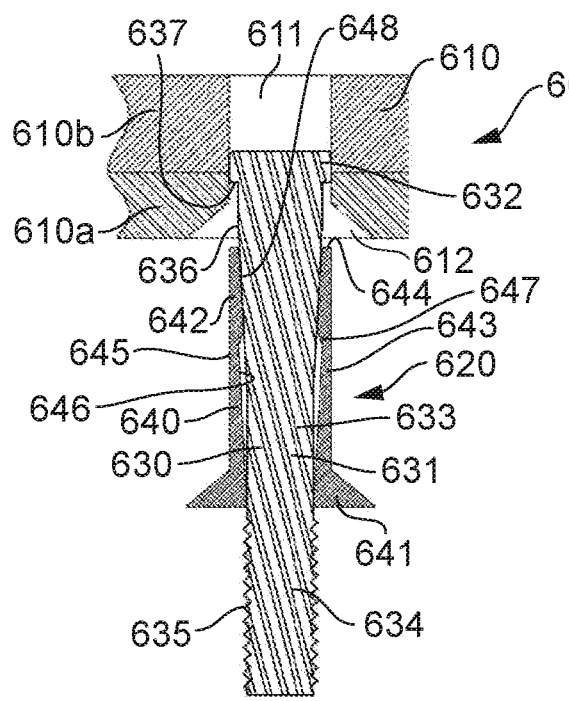
FIG. 18 is a cross-sectional side view of an alternative fastening system being inserted into an aperture in a structure.
Figure 19:
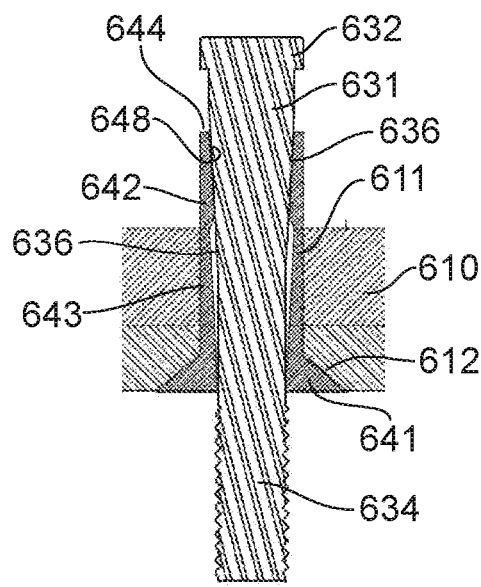
FIG. 19 is a cross-sectional side view of the fastening system of FIG. 18 part-way through installation.

Upon installation of the fastener 620, the fastener 620 is inserted through the aperture 611 as shown in FIG. 18. The fastener 620 is initially in the undeformed condition, with the taper 648 of the deformable section 642 locating against the tapered portion 636 of the stem 631. The free end 644 of the sleeve 640 is spaced from the head 632. When the fastener 620 is inserted, the countersink flange 641, acting as the locating feature, locates in the countersink 612 as shown in FIG. 19. The collar section 643 is therefore received in the aperture 611. The deformable section 642 protrudes from the opposing side of the structure 610. The collar section 643 is slide or push fitted into the aperture 611. The sleeve 640 is free to slide along the stem 631.

The sleeve 640 is held in position, and a tool (not shown) engages the tool engaging section 634 of the stem 631. The mandrel 630 is drawn through the sleeve 631 in the direction of the arrow in FIG. 19. The head 632 is moved towards the sleeve 640 and into contact with the free end 644. A compressive force is therefore applied to the sleeve 640. As the stem 631 is moved, the corresponding tapered faces of the sleeve 640 and stem 631 are brought together.

Figure 20:
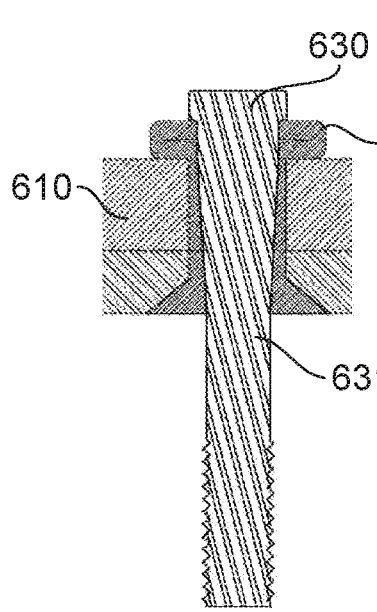
FIG. 20 is a cross-sectional side view of the fastening system of FIG. 18 part-way through installation.

The compressive force exerted by the mandrel 630 causes the deformable section 642 to deform outwardly. That is the deformable section 642 buckles and collapses. The deformable section 642 forms a shoulder as shown in FIG. 20. The sleeve 640 therefore has extended portions on either side of the structure 610. As the stem 631 is drawn along its longitudinal axis, the tapered portion of the stem 631 moves into abutment with the internal tapered surface of the sleeve 640. These two surfaces are brought into an interference fit. The longitudinal movement of the stem 631 relative to the sleeve 640 causes the stem to apply a radially acting force on the collar section 643 of the sleeve 640.

The collar section 643 of the sleeve 640 is urged to distend outwardly. The collar section 643 is therefore urged into an interference fit with the stem 631, and the action of the stem 631 on the collar section 643 urges the collar section into an interference fit with the side wall of the aperture 611.

By forming an interference fit in the aperture 611, and between the sleeve 640 and stem 631 it is possible to restrict the formation of any gaps or spaces in the joint 600 which may lead to the formation of a sparking or plasma formation.

Figure 21:
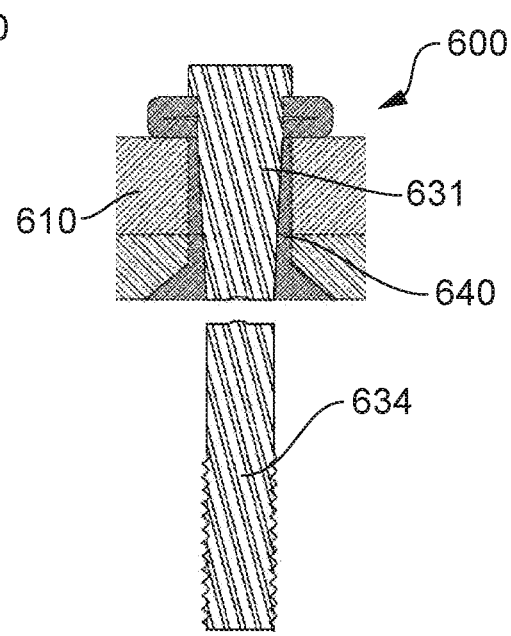
FIG. 21 is a cross-sectional side view of the fastening system of FIG. 18 after installation.

The further longitudinal action of the tool on the mandrel causes the frangible joint to break, such that the tool engaging section 634 is removed from the remainder of the mandrel, as shown in FIG. 21.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of securing a fastener and a spark containment cap to a structure, the method comprising:
disposing a spark containment cap over an aperture in the structure;
providing an annular bead of uncured sealing material between the structure and the spark containment cap;
curing the bead of sealing material to form a sealed cavity between the spark containment cap and the structure;
after the bead of sealing material has cured, inserting a fastener through the aperture from an opposing side of the structure to the spark containment cap; and
after the fastener has been inserted through the aperture, engaging the fastener to form a joint.

2. A method according to claim 1, wherein engaging the fastener to form the joint comprises deforming the fastener.

3. A method according to claim 1, wherein the fastener is inserted and fully installed in the aperture from only one side of the structure, which is the opposing side of the structure to the spark containment cap.

4. A method according to claim 1, wherein the spark containment cap does not come into contact with the fastener.

5. A method according to claim 1, wherein the spark containment cap comprises an annular sealing volume, and uncured sealing material is injected into the annular sealing volume to form the annular bead of uncured sealing material.

6. A method according to claim 1, further comprising: receiving a locating tool through the aperture; drawing part of the locating tool through the aperture to draw the spark containment cap at one end of the tool against the structure; curing the bead of sealing material whilst the spark containment cap is drawn against the structure; releasing the locating tool from the spark containment cap; and inserting the fastener through the aperture following withdrawal of the locating tool from the aperture.

7. A method according to claim 1, wherein the fastener is a blind fastener or a blind rivet.

8. A method according to claim 1, wherein the structure comprises a boundary of an aircraft fuel tank.

9. A method according to claim 1, wherein the fastener comprises a sleeve with a deformable section, and wherein engaging the fastener to form the joint comprises causing the deformable section to deform outwardly to form a shoulder.

10. A method according to claim 1, wherein the spark containment cap comprises a cap body having an annular base which surrounds an opening into the cavity, the sealing material is around the opening into the cavity, and the sealing material provides a seal between the cap body and the structure to seal a volume of gas within the cavity.

11. A method according to claim 1, wherein the fastener does not engage with the sealing material.

12. A joint comprising:
a structure;
a fastener having a fastener end protruding from the structure;
a spark containment cap comprising a cap body having an annular base which surrounds an opening into an air cavity enclosing the end of the fastener; and
a cured sealing material around the opening into the air cavity to provide a seal between the cap body and the structure to seal a volume of gas within the air cavity;
wherein the spark containment cap is spaced from the fastener, and the fastener does not engage with the spark containment cap.

13. A joint according to claim 12, wherein the fastener is a blind fastener or a blind rivet.

14. A joint according to claim 12, wherein the cap comprises a locating tool connecting feature.

15. A joint according to claim 14, wherein the locating tool connecting feature is configured to connect with a locating tool received through an aperture in the structure.

16. A joint according to claim 12, wherein the structure comprises a boundary of an aircraft fuel tank.

17. A joint according to claim 12, wherein the fastener comprises a deformed sleeve with a shoulder contacting the structure.

18. A joint according to claim 12, wherein the fastener does not engage with the cured sealing material.

19. A joint according to claim 12, wherein the cured sealing material comprises an annular bead.

20. A joint according to claim 19, wherein the annular base terminates at a rim which surrounds the opening into the air cavity; the spark containment cap further comprises an annular sealing volume extending around the rim; and the annular sealing volume receives the annular bead.

* * * * *